F. W. C. BAILEY.
TRUCK.
APPLICATION FILED SEPT. 24, 1908.
925,795.
Patented June 22, 1909.
3 SHEETS—SHEET 1.
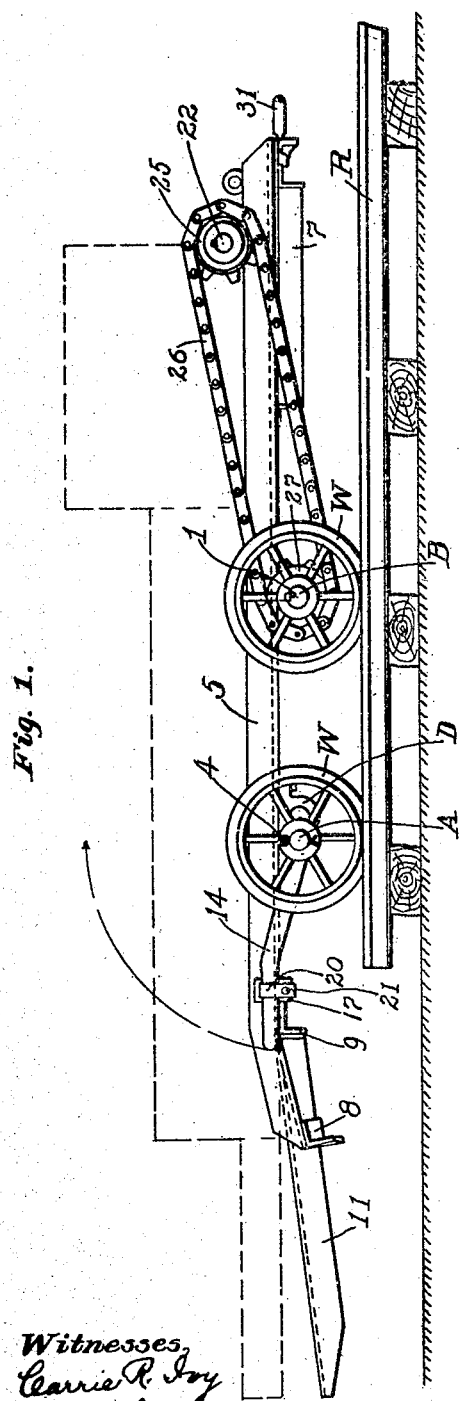
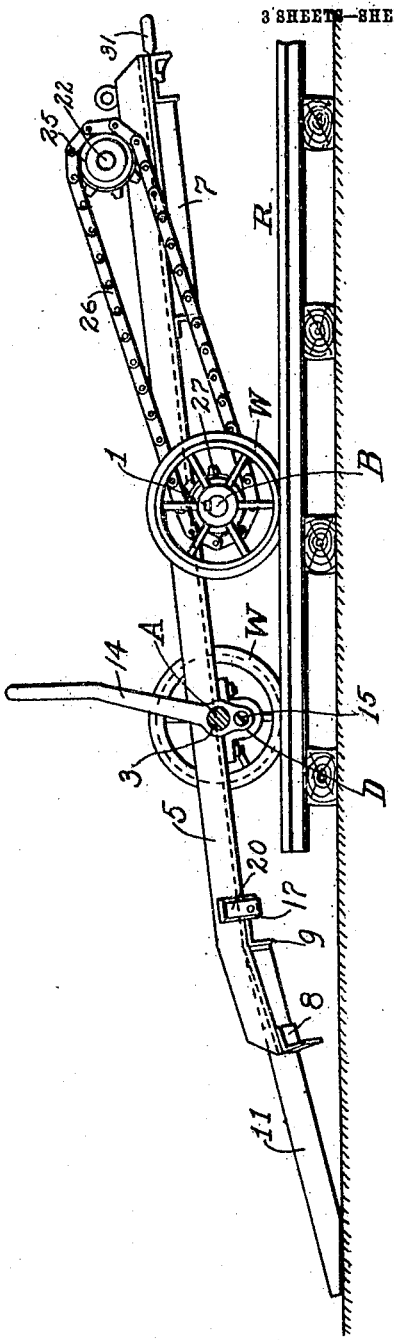
Witnesses
Carrie R. Ivy
Wm Whaley
Inventor,
Frederick W. C. Bailey,
By Cyrus Kehr
Attorney F. W. C. BAILEY.
TRUCK.
APPLICATION FILED SEPT. 24, 1908.
925,795.
Patented June 22, 1909.
3 SHEETS—SHEET 2.
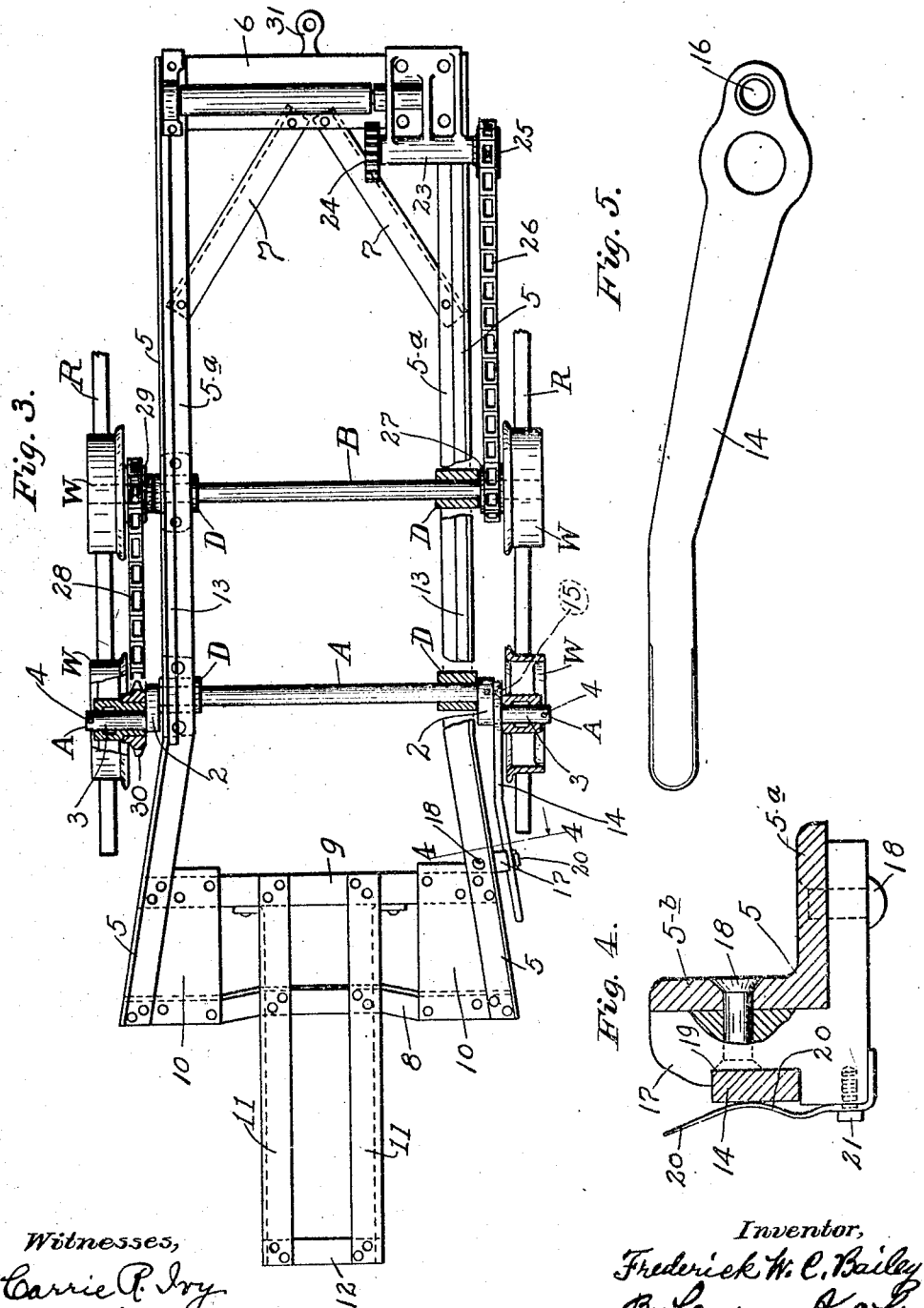
Witnesses,
Carrie P. Ivy
Wm Whaley
Inventor,
Frederick W. C. Bailey
By Cyrus Kehr
Attorney

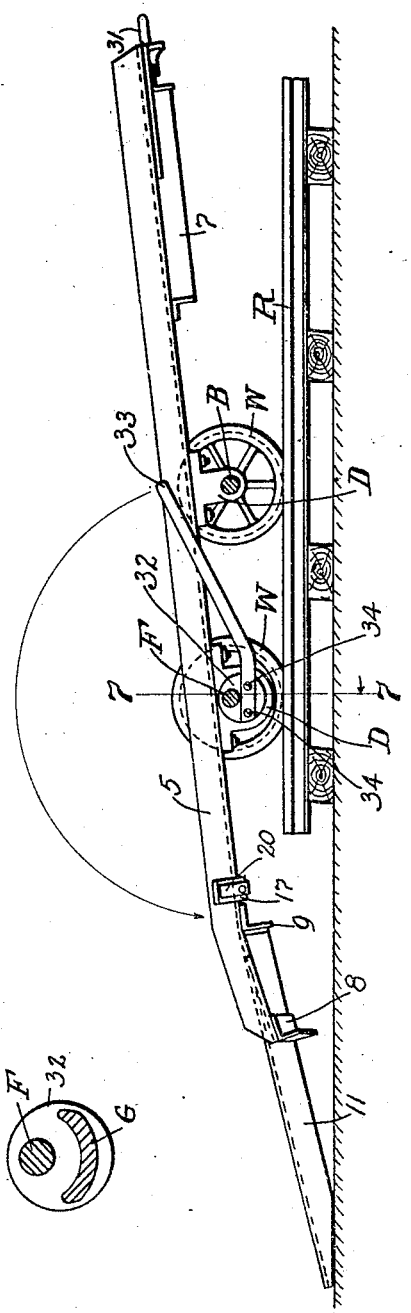
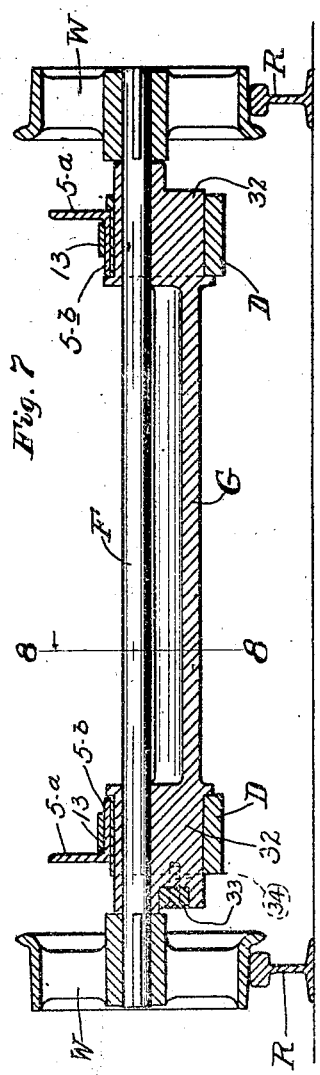

UNITED STATES PATENT OFFICE.

FREDERICK W. C. BAILEY, OF KNOXVILLE, TENNESSEE.

TRUCK.

No. 925,795.

Specification of Letters Patent.

Patented June 22, 1909.

Application filed September 24, 1908. Serial No. 454,501.

*To all whom it may concern:*

Be it known that I, FREDERICK W. C. BAILEY, a citizen of the United States, residing at Knoxville, in the county of Knox and State of Tennessee, have invented a new and useful Improvement in Trucks, of which the following is a specification, reference being had to the accompanying drawing.

My improvement relates particularly to tilting trucks used for transporting coal cutters and similar machines in coal mines.

The object of the improvement is to provide such a truck adapted for use in mines having low ceilings.

Some of the trucks now in use for transporting coal cutters have a relatively flat, longitudinal, tiltable frame or platform supported by two transverse axles, which axles are supported at each end by a wheel adapted to run on a track rail, said frame or platform being adapted to receive thereon a coal cutting machine, said machine being drawn or slipped endwise upon one end of the truck platform, after said platform has been tilted on the axle of the wheels adjacent said end until said end has been lowered close to or upon the ground or upon the track upon which the truck stands. This form is objectionable, because such tilting brings the raised end of the truck platform so high as to leave insufficient room for receiving and unloading the cutting machine when the ceiling of the mine is low, and because the truck is rendered unstable by being put upon only two wheels, the wheels under the raised portion of the platform being lifted from the rails.

In my improved truck, the forward portion of the truck platform is tilted by lowering it at the forward wheels, relative to the axial line of said wheels, until the front of the platform rests on the track or ground.

In the accompanying drawings, Figure 1 is a side elevation of a truck embodying my improvement, the forward portion of the platform being at its normal elevation; Fig. 2 is a similar elevation, the front portion of the platform being lowered so as to bear upon the ground; Fig. 3 is a plan of the truck shown in Figs. 1 and 2, portions being broken away; Fig. 4 is a section on the line 4—4 of Fig. 3, looking in the direction of the arrow; Fig. 5 is a side elevation of a lever used in changing the elevation of the front portion of the truck platform; Fig. 6 is a side elevation of a truck embodying my improvement in another form; Fig. 7 is a section on the line 7—7 of Fig. 6, looking in the direction of the arrow; Fig. 8 is a section on the line 8—8 of Fig. 7, looking in the direction of the arrow.

Referring first to Figs. 1 to 5, inclusive, R, R are track rails which support the truck wheels, W.

For convenience in description, the end of the truck at the left in Figs. 1, 2, and 3 will be herein designated as the forward end of the truck, and the pair of wheels at the left will be termed the forward wheels, while the opposite or right hand end of the truck will be designated as the rear end of the truck and the pair of wheels, W, at the right will be designated as the rear wheels.

The forward wheels, W, support an axle, A, and the rear wheels, W, support an axle, B; and said axles support the approximately horizontal frame or platform, C, said axles resting in bearings, D, on the lower portion of the platform.

The rear axle is straight from end to end, and in the form shown in the drawings, the wheels, W, surrounding said axle are secured thereto by means of a key, 1, so that said axle and said wheels are secured rigidly to each other and must move in unison.

The forward axle, A, is a crank axle or shaft having near each end a crank, 2, on which is a journal, 3, extending loosely through the hub of the wheel, W. In the projecting portion of said journal is a cotter pin, 4, which serves to retain said wheel on said journal.

The frame or platform, P, is approximately rectangular, but the drawings show the forward portion or end widened. In each side of the platform and adjacent the wheels, W, said frame contains a side rail, 5, which is formed of angle iron having a lower horizontal flange, 5ª, directed toward the opposite rail, and an upright flange, 5ᵇ, rising from the flange, 5ª. The rear ends of said rails are joined by a horizontal transverse plate, 6; and oblique braces, 7, are joined to said plate and to said rails. Forward of the axle, A, said rails are bent slightly away from each other. The left hand ends of said rails are joined by a cross bar, 8, the middle portion of which dips downward a few inches. A little way rearward of the cross bar, 8, a similar cross bar, 9, joins said rails. Adjacent each of said rails, a plate, 10, rests upon and is secured to said cross bars. At opposite sides of, near to, and parallel to the middle longitudinal line of the truck are two bars, 11, which extend across the bars, 8 and 9, and are secured thereto and extend thence forward. The forward ends of said bars, 11, are joined by a cross bar, 12. In each angle of the straight portion of the side rails, 5, is a strengthening plate, 13. Inasmuch as this platform has been heretofore used in such trucks, I deem it unnecessary to describe it further.

Between one of the wheels, W, and the adjacent crank, 2, a lever, 14, surrounds the journal, 3, and rests flatwise against the transverse arm of said crank and is secured thereto by a screw, 15, extending through an aperture, 16, in said lever into said portion of the crank. Thus said lever is made rigid with the crank or with the crank shaft, so that when said lever is moved in a plane transverse to the crank shaft, said shaft is rotated according to the arc through which said lever moves. A latch block, 17, is secured to the outer side of the adjacent side rail, 5, forward of said crank shaft by means of rivets, 18. In said block is a recess, 19, adapted to receive said lever. A blade spring, 20, extends across said notch and is secured to the block below said notch by a screw, 21. The upper end of said spring is turned outward, and the portion of the block above said notch is slightly tapered, so that when said lever is pressed downward, it will readily pass between said block and said spring, crowding the latter outward, until said lever rests in said notch. When said lever is once in said position, said spring will hold it there until the lever is moved outward by a force sufficient to overcome said spring. However, if so desired, said spring may be omitted, and the lever, 14, made laterally flexible and set so as to require outward flexing to move it into said notch when the lever is moved downward. In the form shown in the drawings, the relation of the parts is such as that when the crank shaft is in an approximately horizontal plane, said lever will be in approximately a horizontal position and engaged in said latch block, and in such position, the engagement between the frame and the forward axle is at the same height as the engagement between the frame and the rear axle, so that the frame is held at approximately the horizontal position. (See Fig. 1.) For lowering the front of the platform, the lever, 14, is released from the latch block and allowed to follow the course of the arrow in Fig. 1, the load on the crank axle bearing the latter downward until its lower limit is reached or until the forward end of the platform (the portion composed of the bars, 11, 11, and the cross bar, 12) bears upon the ground. (See Fig. 2.)

It will be observed that, by thus making the front axle a crank axle, the horizontal transverse pivotal line of the truck platform is transferred from the front axle to the rear axle, by which means the portion of the frame which dips downward (the portion forward of said pivotal line) is lengthened, while the portion which tilts upward (the portion rearward of said pivotal line) is shortened. And it will be seen that because of the lengthening of the portion of the platform forward of said pivotal line, the angle of movement required to bring the forward end downward into contact with the ground is much reduced, and that, for that reason, the angle of movement of the portion of the platform rearward of said pivotal line is much reduced, and that, furthermore, the distance through which the extreme rear end of the portion of the platform rearward of said pivotal line moves is much reduced by the shortening of said portion to the extent of the distance between the two wheel axles. Through these two factors, the rear end of the platform is, when the platform is tilted, left materially lower than when the platform is tilted on the front axle; and such difference in elevation is important in mines having low ceilings. And, in a secondary way, such difference is also important because the slant of the platform as a whole is less when the platform is tilted on the rear axle, and it is therefore easier to draw the coal cutter or other mining machine from the ground upon said frame. Furthermore, the four supporting wheels are left upon the rails and the truck is therefore more stable during the loading operation than would be the case were two of said wheels lifted from the rails.

In Fig. 1, the dotted lines indicate in a general way the position of the cutting machine upon the truck. Usually the horizontal flanges, 5ª, of the side rails, 5, form ways upon which the machine moves.

In some cases the machine is drawn upon the truck by hand and in some cases by mechanical power. In some cases this mechanical power is furnished by the motor on the cutting machine. In Figs. 1, 2, and 3, a portion of the gearing used in propelling the truck by power transmitted from the cutting machine is shown. A shaft, 22, rests in a bearing, 23, on one end of which is a spur gear wheel, 24, and on the other end of which is a sprocket wheel, 25, from which extends a sprocket chain, 26, to and around a sprocket wheel, 27, on the rear axle, B. At the opposite side of the truck is a sprocket chain, 28, surrounding a sprocket wheel, 29, on the rear axle, B, and a sprocket wheel, 30, on the side of the supporting wheel, W, on the adjacent end of the forward axle, A. Power applied to the spur gear wheel, 24, from a motor on the cutting machine will, as will be readily understood from an inspection of the drawings, propel the truck by turning the axle, B, and the two wheels, W, thereon and the one wheel, W, on the axle, A. The truck is also provided with a coupling head, 31, for the attachment of a rope or chain or mine locomotive for moving the truck.

In the form illustrated in Figs. 6, 7, and 8, the platform and the rear axle are the same as in the form illustrated by Figs. 1, 2, and 3; but the forward axle, F, is straight and keyed to the wheels, just as is the case with the rear axle and rear wheels. A cam piece, G, surrounds the axle, F, and has eccentrics, 32, resting in relatively large bearings, D, applied to the lower sides of the side rails, 5, 5, of the truck platform. A lever, 33, similar to the lever, 14, is applied to the outer end of one of the eccentrics, below the axle, by two screws, 34. And said lever is arranged to be engaged by the latch block, 17. Said lever is preferably so set as to move through approximately a half a circle in turning the cam piece, in order that the major portion of said cam piece may be moved from below the axle until it rests above the axle. In this manner, the maximum of lift may be imparted to the front portion of the truck platform by an eccentric having a certain difference in radii.

I claim as my invention:

1. In a tilting truck, the combination with a low, horizontal track platform, of two pairs of supporting wheels, mechanism for joining one of said pairs of wheels to said platform, and mechanism for joining the other pair of said wheels to said platform for up-and-down adjustment of the platform, substantially as described.

2. In a tilting truck, the combination with a low, horizontal track platform, of two pairs of supporting wheels, mechanism for joining one of said pairs of wheels to said platform, and mechanism including a locking lever for joining the other pair of said wheels to said platform for up-and-down adjustment of the platform, substantially as described.

3. In a tilting truck, the combination with a low, horizontal track platform, of two pairs of supporting wheels, mechanism for joining one of said pairs of wheels to said platform, a crank axle joining the other pair of said wheels to said platform, and means for partially rotating said crank axle, substantially as described.

4. In a tilting truck, the combination with a low, horizontal track platform, of two pairs of supporting wheels, mechanism for joining one of said pairs of wheels to said platform, a crank axle joining the other pair of said wheels to said platform, a lever for turning said crank axle, and means for locking said lever, substantially as described.

5. In a tilting truck, the combination with a low, horizontal track platform comprising side rails, two pairs of bearings on said platform, an axle resting in one pair of said bearings, a crank axle resting in the other pair of said bearings, and supporting wheels on said axles, substantially as described.

6. In a tilting truck, the combination with a platform comprising side rails, two pairs of bearings on said platform, an axle resting in one pair of said bearings, a crank axle resting in the other pair of said bearings, supporting wheels on said axles, and a locking lever combined with said crank axle for partially turning the latter, substantially as described.

7. In a tilting truck, the combination with a platform, of two pairs of supporting wheels, mechanism joining one pair of said wheels to said platform, a crank axle having journals extending into the other pair of supporting wheels, and a locking lever surrounding one of said journals and joined to said crank axle adjacent said journal, substantially as described.

8. In a tilting truck, the combination with a low, horizontal track platform, of a crank axle, supporting wheels on the journals of said axle, and power transmitting mechanism applied to said wheels, substantially as described.

9. In a tilting truck, the combination with a low, horizontal track platform, of a crank axle, supporting wheels on the journals of said crank axle, a sprocket wheel applied to one of said supporting wheels, and a sprocket chain applied to said sprocket wheel, substantially as described.

10. In a tilting truck, the combination with a low, horizontal track platform broadened at its forward end, of two pairs of supporting wheels, mechanism for joining one of said pairs of wheels to said platform, and mechanism for joining the other pair of said wheels to said platform for up-and-down adjustment of the platform, substantially as described.

In testimony whereof I have signed my name, in presence of two witnesses, this 21st day of September, in the year one thousand nine hundred and eight.

FREDERICK W. C. BAILEY.

Witnesses:
 CYRUS KEHR,
 C. A. MORSE.